United States Patent [19]

Williamson

[11] Patent Number: 4,686,616

[45] Date of Patent: Aug. 11, 1987

[54] POWER SUPPLY OPERABLE ON VARYING INPUTS

[75] Inventor: Floyd L. Williamson, Duluth, Ga.

[73] Assignee: Intecolor Corporation, Norcross, Ga.

[21] Appl. No.: 914,815

[22] Filed: Oct. 3, 1986

[51] Int. Cl.[4] .......................................... H02M 3/335
[52] U.S. Cl. ..................................... 363/21; 363/37; 363/49; 363/143
[58] Field of Search ...................... 363/21, 37, 49, 143

[56] References Cited

U.S. PATENT DOCUMENTS 3,697,854 10/1972 Berger .................................. 363/21

OTHER PUBLICATIONS

Dolbachian, "Design and Construction of a 200W Switched Mode Power Supply", Toute Electron. (France), No. 458, pp. 73–78, Nov. 1980.

Groves et al, "Capacitive Start–Up Circuit for Switching Power Supply", IBM Tech. Discl. Bul., vol. 27, No. 4B, p. 2320, Sep. 1984.

"110 VAC/200 VAC Detector Switch", IBM Tech. Discl. Bul., vol. 27, No. 10B, pp. 6214–6215, Mar. 1985.

Primary Examiner—William H. Beha, Jr.
Attorney, Agent, or Firm—James B. Middleton

[57] ABSTRACT

A power supply provides the stable DC voltages needed for a computer terminal from a wide range of line voltages and frequencies. The line is rectified and fed to a flyback transformer wherein primary current is controlled in duration for providing the desired energy transfer to the secondary winding. The outputs from the flyback transformer are rectified and filtered. A separate start-up circuit uses a transformer across the line voltage, and a positive coefficient resistor provides a time limit to allow the use of a small transformer even though the line voltage may be high. The start-up circuit must produce a minimum voltage for the switching transistor in the flyback arrangement to allow operation of the power supply, and the start-up transformer is disconnected from the circuit after operation to prevent electromagnetic interference within the terminal. The output from the power supply is used in the control of the switching transistor so that, once the start-up circuit has achieved the needed voltage level, the power supply can assist in maintaining the operation.

8 Claims, 3 Drawing Figures

POWER SUPPLY OPERABLE ON VARYING INPUTS

INFORMATION DISCLOSURE STATEMENT

It is well known in the art to provide a power supply wherein a given voltage, or range of voltages, acts as the input, and a stabilized DC output is provided. Furthermore, it is known in the art to utilize a transformer wherein current flow through the primary winding of the transformer is controlled by a transistor or other switching means in order to vary the energy output of the transformer. With this arrangement, a pulse can be provided, and the width of the pulse determines the length of time the switching means is on to allow current to flow through the primary winding of the transformer. As a result, the energy output is determined by the width of the pulse to the switching means. These pulse width controls normally utilize a generally conventional transformer wherein the change in magnetic flux in the primary winding is directly reflected in an induced voltage in the secondary winding.

With the prevalence of computer terminals, and the need to operate these terminals from the various standard power sources available around the world, it would be desirable to utilize a single power supply for any power available. The two primary problems in utilizing the available power are the extremely low voltages that sometimes occur, either through design, or through temporary overload, or "brown-out"; and, some areas of the world utilize a relatively high voltage, for example about 250 volts, while other areas of the world utilize a relatively low voltage, for example 108 volts. Furthermore, the frequency of the power is not always the same. While 50 to 70 Hz is common, there are situations in which the frequency is lower than intended, because of errors or the like.

In utilizing prior art arrangements, it should be understood that the availability of an extremely low voltage will not provide sufficient power to allow the power supply to begin to produce the desired voltages. Furthermore, if the line voltage is very close to the voltage required, but slightly low, the components receiving the line voltage may burn out because there is insufficient power to operate the controls. When voltages are extremely high, the prior art circuits are such that they would be unable to absorb or control the energy, so components of a circuit may be damaged, and the voltage produced by the power supply may be higher than desired.

SUMMARY OF THE INVENTION

This invention relates to power supplies for computer terminals, and is more particularly concerned with a power supply operable over a wide range of voltage and frequency inputs.

The present invention provides a power supply utilizing a flyback transformer arrangement wherein switching means determines the current flow in the primary winding of the transformer. Current limiting means is provided to protect the circuitry, and pulse width control means determines the duration of current flow through the primary winding. The primary winding of the flyback transformer is designed to withstand very high voltage, so a wide range of voltage inputs can be utilized. Because of the control for the switching means, the flyback transformer will not operate if the voltage is too low.

A separate start-up circuit is provided, the start-up circuit yielding a reference voltage. When the reference voltage reaches a minimum level, the power supply begins to operate; and, after a predetermined length of time, the start up circuit is de-energized to prevent the production of electromagnetic interference.

At all times during the operation of the power supply, the output voltage is sensed, and the on and off cycles of the switching means of the flyback transformer are varied to adjust the voltage as needed. When the voltage drops below a predetermined level, the power supply will not operate, and the start-up circuit is energized. When the voltage drops below the predetermined level, there will always be a sufficient time delay for the computer circuitry to reset before the power supply is reactivated.

BRIEF DESCRIPTION OF THE DRAWINGS

These and other features and advantages of the present invention will become apparent from consideration of the following specification, when taken in conjunction with the accompanying drawings in which.

DETAILED DESCRIPTION OF THE EMBODIMENT

Figure 1:
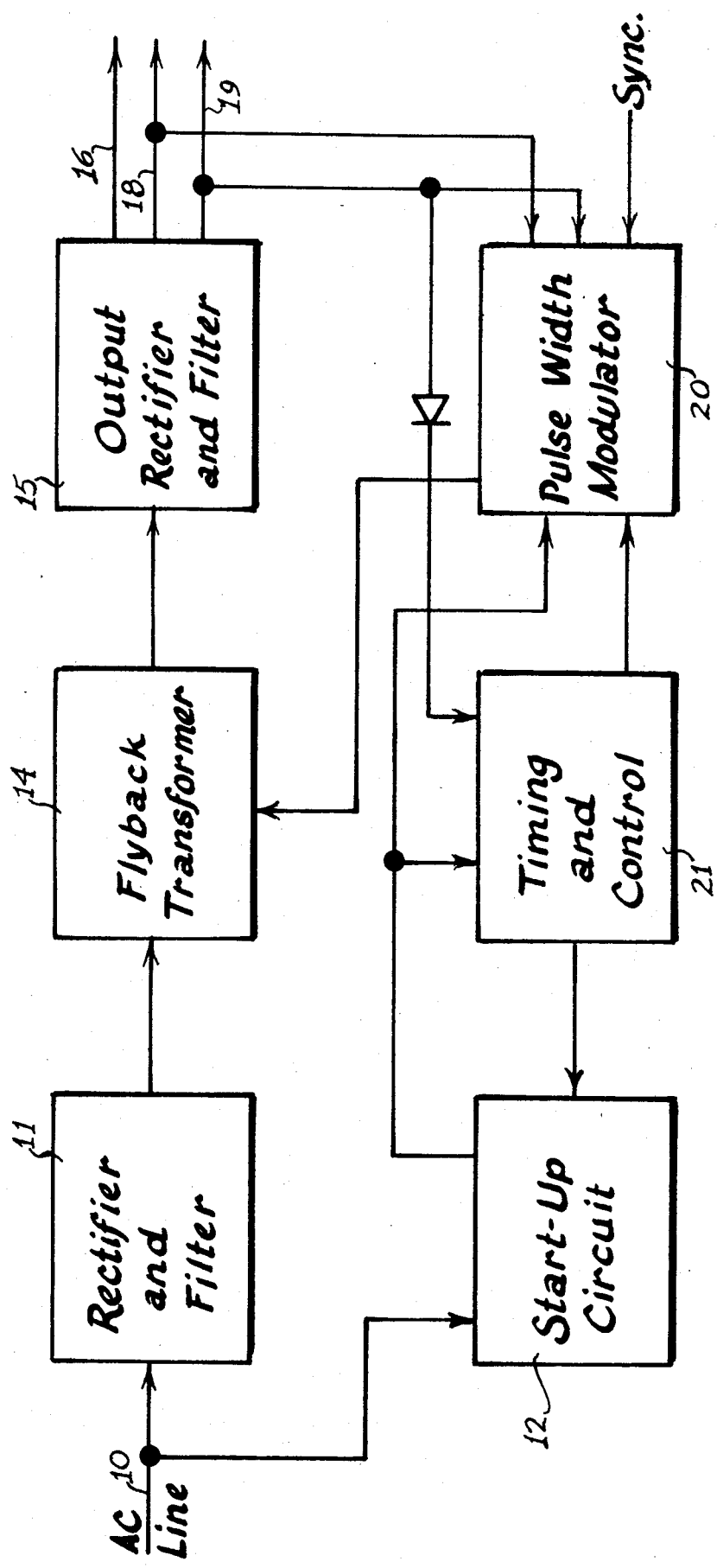
FIG. 1 is a block diagram illustrating a power supply made in accordance with the present invention; and, FIGS. 2 and 3 are schematic diagrams illustrating a power supply made in accordance with the present invention.

Referring now more particularly to the drawings, and to that embodiment of the invention here presented by way of illustration, FIG. 1 is a block diagram showing operation of a power supply made in accordance with the present invention. The power source is from the conventional AC line indicated at 10, and the line voltage may be as low as 40 VAC or as high as 440 VAC. Also, the frequency of the power source 10 may be as low as 30 Hz, or as high as several kHz. In any event, the incoming line is fed to a rectifier and filter 11 to produce a DC voltage and to remove a significant portion of the noise on the line. It will be noted that the AC supply is also connected directly to the start-up circuitry 12, and this will be discussed in further detail later.

The output from the rectifier and filter 11 is fed to a flyback transformer 14. This flyback arrangement produces a plurality of DC outputs, and the outputs are rectified and filtered at 15. Loads may then be connected to the output lines 16, 18 and 19.

The incoming line 10 may sometimes have a voltage so low that the circuitry of the power supply cannot produce the desired outputs. In this event, there must be some means for preventing outputs that are too low for proper operation but high enough to cause some damage to the circuitry of the load. When the power supply of the present invention is initially energized, the arrangement is such that there will be no output from the flyback transformer 14 until the start-up circuit 12 can produce a minimum voltage. Thus, the start-up circuitry 12 receives the incoming line voltage, and directs an output to the pulse width modulator 20. If the signal from the start-up circuitry 12 is below the minimum threshold, the control 21 holds the modulator 20 off, which holds the switching means for the flyback transformer off. There will thus be no current flowing through the primary of the flyback transformer 14.

Once the start-up circuitry 12 achieves the minimum voltage, the signal will be fed to the pulse width modulator 20, which will in turn signal the flyback transformer 14 and cause a current to flow in the primary of the flyback transformer 14. This will result in an output to the output rectifier and filter 15, and yield a voltage on the output lines 16, 18 and 19. It will then be noticed that the output is fed to the pulse width modulator 20, and also to the timing and control 21. The timing and control 21, in turn, is connected to the start-up circuitry 12 and to the pulse width modulator.

In general, it should be understood that the output voltage on the lines 18 and 19 is constantly monitored to change the width of the pulse fed to the switching means and the flyback transformer 14. The variation in the time that current flows in the primary winding is the means for control to achieve the desired output voltages at 16, 18 and 19.

The output voltage is further monitored by the timing control 21 so that, if the output voltage drops below a predetermined voltage, the pulse width modulator 20 will prevent further operation of the flyback transformer 14, and the start-up circuitry 12 will be reconnected into the circuit. The start-up sequence will be attempted, and will not be successful until the start-up circuitry 12 is able to produce the minimum voltage.

The timing and control 21 further includes timing means so that, once the output voltage from the output rectifier and filter 15 drops below a predetermined minimum voltage, the circuitry is held off for a minimum length of time. This is important for computer circuitry so that the computer circuity will reset rather than become locked in a given state.

As will be discussed further hereinafter, the specific design of the flyback transformer 14 is important to the present invention since this allows a very low voltage to produce the desired voltage. When the voltage at line 10 is extermely low, the output voltage from the output rectifier and filter 15 is fed through the pulse-width modulator 20 to provide a longer pulse, to give the desired energy input to the primary of the flyback transformer 14. On the other hand, if the incoming line 10 is an extremely high voltage, the switching means on the primary remains on for a very short time to provide the same desired energy input.

Figure 2:
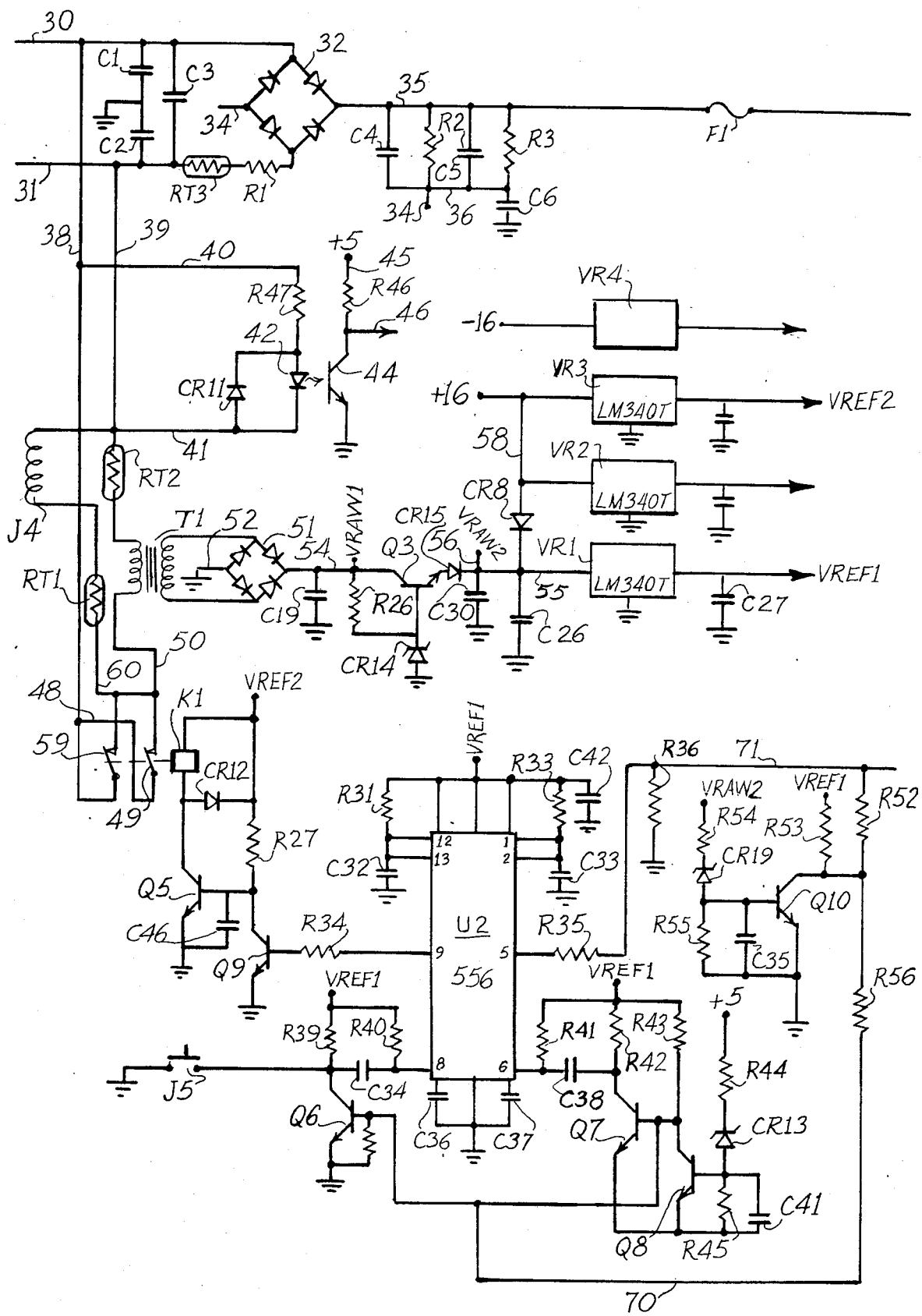
Figure 3:
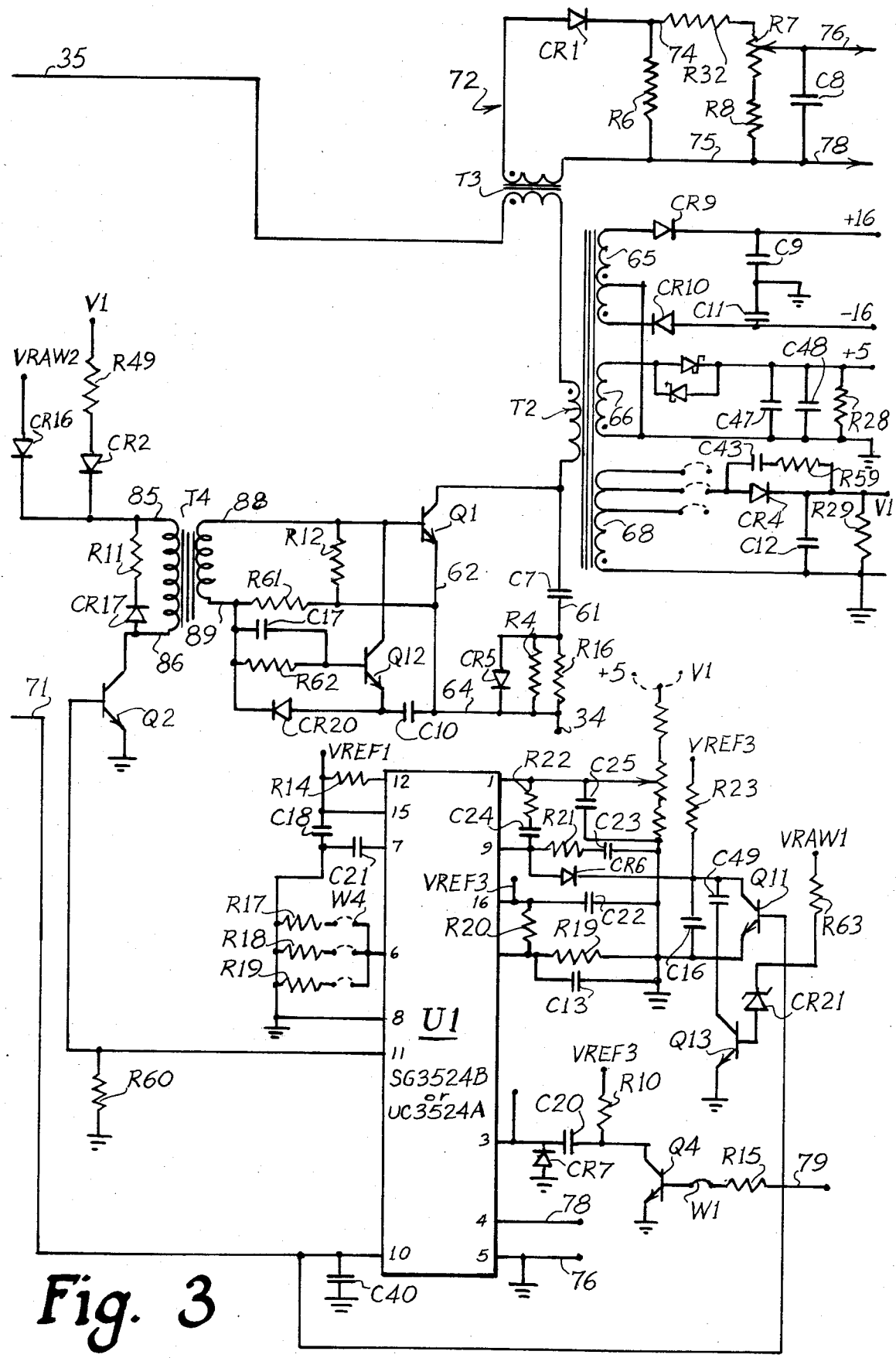

For a further understanding of the power supply of the present invention, attention is directed to FIGS. 2 and 3 of the drawings.

In FIG. 2, it will be seen that the available line power will be applied to the lines 30 and 31. There are capacitors C1, C2 and C3 placed across the lines 30 and 31 to filter the line and remove the majority of the noise on the line. The lines 30 and 31 then continue to a full-wave rectifier designated at 32. The negative side of the rectified voltage is indicated at 34, and the positive side is indicated as the line 35.

Beyond the rectifier 32, there are capacitors C4 and C5 connected to the line 35, and also connected to line 34 through the bus 36. Further, resistors R2 and R3 are connected between the bus 36 and the line 35. The bus 36 is grounded through capacitor C6. The arrangement including capacitors C4, C5 and C6 and resistors R2 and R3 will therefore filter the rectified voltage so that most of the noise on the line is removed. After the filtering network just described, there is a fuse designated at F1.

Referring back to the incoming lines 30 and 31, there are branch lines 38 and 39 connected to the lines 30 and 31 respectively. There is a line synchronization circuit connected to the branch lines 38 and 39 by the lines 40 and 41. A light emitting diode (LED) 42 allows current to flow in one direction, and diode CR11 allows current to flow in the opposite direction. In both directions, current is limited by the resistor R47. It will therefore be seen that light will be emitted from the diode 42 at each half cycle of the alternating current from the line, and light from the diode 42 will trigger the phototransistor 44. With +5 VDC applied at 45, current can flow from 45, through the resistor R46, through phototransistor 44, and to ground. Each time current flows in this path, a signal will be transmitted along the line 46 which will yield a synchronization pulse. Thus, if the power supply, or other related equipment, is to be synchronized with the line frequency, the pulse on line 46 will provide the appropriate timing signal.

Looking again at the lines 38 and 39, the line 39 includes a positive coefficient resistor designated at RT2 in series with the primary winding of the transformer T1. When the lines 30 and 31 are connected to a power source, power will be available on the lines 38 and 39 so that current can flow through the line 38, through the connecting line 48, through the normally closed relay contact 49, then through the line 50 and to the primary winding of the transformer T1. From the transformer T1, current can flow through the resistor RT2 and to the line 39, then to the line 31. As a result, the transformer T1 will be energized to produce a voltage on its secondary winding. The transformer T1 and its associated circuitry comprise the start-up circuit for the power supply.

The transformer T1 has connected thereto a full wave rectifier designated at 51, with the negative side grounded at 52, and the positive side connected to the line 54.

One of the salient features of the present invention is the ability to provide the entire power supply in a very small and relatively light-weight circuit to be incorporated directly within computer terminals. Considering the wide voltage range over which the transformer T1 must operate, conventional engineering would require an extremely large transformer, to the extent that the transformer T1 could not be mounted on a printed circuit board. The use of a very small transformer is not indicated because of the heat generated at high voltages, so the transformer T1 would burn out after a very short operating time.

In the present invention, it is contemplated that the transformer T1 will be operated only long enough for the principal power supply to become operative, and the transformer T1 needs to be de-energized in order to prevent magnetic interference from the transformer. With this in mind, a small and light-weight transformer was designed, and the resistor RT2 was installed as an additional safety feature. The operating parameters of RT2 are such that, if T1 is operative for a length of time that may cause damage to the transformer T1, the resistance of RT2 will increase to the point that current flow through the transformer T1 will be effectively terminated. Since the resistor RT2 is a positive coefficient resistor, it will be understood that the temperature of RT2 is directly related to the current through the transformer T1, and high current through transformer T1 will cause the resistance of RT2 to increase sufficiently that current will be negligible.

In normal operation, once the power supply is fully operational, the relay K1 will be energized to open the contact 49 to de-energize the transformer T1. The operation of relay K1 will be described further hereinafter, but it should be understood that, in normal operation, the relay contacts 49 will open before the temperature of RT2 becomes high enough to shut down the transformer T1.

Returning now to the start-up circuitry, and looking at the line 54 connected to the rectifier 51, the line 54 is connected to the collector of transistor Q3, and the emitter of Q3 is connected to the line 55. The base of the transistor Q3 is connected through zener diode CR14 to ground; and, between the base of Q3 and the diode CR14, a resistor R26 is connected to the line 54. With this arrangement, the output at 56 will be a DC voltage that directly follows the incoming line voltage. Because the diode CR14 is a zener, in the beginning the voltage at 56 will follow the voltage at 54. Once the voltage exceeds the zener voltage, the voltage on the line 55 will be pulled down, resulting in a voltage on the line 55 at no more than one diode drop above the zener voltage. In the present embodiment of the invention, the zener voltage of CR14 is 30 volts, so the voltage at 55 will be no more than approximately 30 volts.

The voltage at 56 is labeled VRAW2, and uses for this voltage will be discussed later. Since VRAW2 will never exceed about 30 volts regardless of the line voltage, another voltage labeled VRAW1 is pulled off the line 54 before Q3. It will be seen that VRAW1 will always be proportional to the line voltage.

After the transistor Q3, there is a diode CR15 in the line 55. The diode CR15 is arranged to prevent a higher voltage on the line 55 from damaging the transistor Q3.

Capacitors C30 and C26 are connected between the line 55 and ground to smooth out the pulsed voltage from the AC line, and to increase the signal to noise rejection of voltage regulator circuit VR1. VR1, in conjunction with the capacitor C27, provides a regulated voltage designated as VREF1. In the present embodiment of the invention VREF1 is +12 VDC.

It will be seen that there are additional voltage regulator circuits designated at VR2, VR3 and VR4. VR2 is connected to a branch 58 through a diode CR8 to prevent the start-up voltage on line 55 from attempting to power voltage regulator VR2. Again, capacitors following the regulator VR2 smooth the voltage to produce a +12 VDC, while the parallel circuit VR3 regulates the incoming +16 VDC to produce VREF2.

Returning again to the lines 38 and 39, the line 38 is connected to one side of the relay contact 59. Since contact 59 is normally closed, current will flow through the line 60, and through the positive coefficient resistor RT1, through coil J4, and to the line 39. The coil J4 is a degaussing coil, so it will be understood that the cathode ray tube will be degaussed at each start-up cycle. As was previously mentioned, the relay K1 will be energized after the power supply is in operation, and the operation of relay K1 will open contacts 49 and 59, so the coil J4 will also be de-energized. The positive coefficient resistor RT1 will be heated by the degaussing current, and the heat will increase the resistance to the point that the coil is effectively de-energized. This provides the necessary decaying current required to cause proper degaussing.

Returning now to the line 35 discussed above, this same line extends into FIG. 3, and is connected through the primary winding of transformer T3 to the primary winding of transformer T2. As will be recognized from the following discussion, transformer T2 is not operated as a true transformer, but the transformer T2 is utilized in a flyback arrangement that is well known to those skilled in the art. Typical of the flyback arrangement, there is a switching means for controlling current through the primary winding of the transformer T2, and this switching means in the present embodiment of the invention is transistor Q1 which has its collector connected to the line 61, and its emitter connected through the line 62 to a bus 64 which is connected to the line 34 from the rectifier 32.

In general, it will be understood that current will flow through the line 35, and through the primary winding of the transformer T2, then through the transistor Q1, line 62, to the line 34 and to the rectifier 32, but only so long as the transistor Q1 is conducting. When the transistor Q1 is biased off, current will no longer flow. It will also be noticed that the three secondary windings designated at 65, 66 and 68 include diodes arranged so that, while current is flowing in the primary winding of the transformer T2, no current can flow in the secondary windings. Only when current ceases to flow in the primary winding of the transformer T2, and the magnetic field begins to collapse, will current be allowed to flow in the secondary windings. Because of this arrangement it will be understood that energy is provided to the transformer T2 through the flow of current through the primary winding; then, the discrete amount of energy stored in the transformer is transferred to the secondary windings.

In operation of the power supply of the present invention, it will be understood that the transistor Q1 will be controlled to turn off very quickly in order to limit the energy passed by the transformer T2. Such sudden turn-offs induce great stress on the transistor. To prevent damage to the transistor, a snubber circuit is provided through the line 61, through the capacitor C7 and diode CR5. Resistors R4 and R16 are connected in parallel to the diode CR5. When the transistor Q1 is turned off, current can flow through the capacitor C7 and through the diode CR5, taking the stress off the transistor Q1. The current will of course charge the capacitor C7, and the resistors R4 and R16 will discharge the capacitor C7 at the end of the inductive current. When the capacitor C7 is discharged, the circuitry is ready to act as a snubber for the next turn-off cycle.

It is conventional in power supplies to utilize a soft start, but the conventional power supply does not have to contend with the wide voltage ranges contemplated in the present invention. Thus, the present invention includes a somewhat unusual soft start arrangement wherein the voltage VRAW2 is applied to the base of the transistor Q10 through the zener diode CR19, so Q10 is not turned on until the voltage VRAW2 reaches a minimum voltage of 12 volts. As long as Q10 is off, VREF1 is supplied through resistors R53 and R52 to the line 71, thence to pin 10 of U1, so U1 is held off. Thus, if the start-up circuit cannot produce over 12 volts at VRAW2, the power supply is unable to operate. On the other hand, once VRAW2 exceeds 12 volts, transistor Q10 will be turned on.

VREF1 is applied to the start-up circuit and the modulator chip. When VREF1 reaches about +5 V, U2 starts to operate. As a result, even though Q10 turns on and no longer holds U1 off, U2 is high on pin 5, which holds U1 off. VREF1 is also applied to U1; and, when VREF1 exceeds the undervoltage lockout value, the outputs are enabled, though still held off by U2.

Operation of U2 also makes pin 9 go high, and this turns on transistor Q9, which holds Q5 off. With Q5 off, relay K1 cannot operate even though VREF2 is produced. This assures that the start-up circuit will remain connected into the circuit until U2 times out.

After the predetermined length of time, pin 5 of U2 will go low, releasing pins 9 and 10 of U1. Pin 11 will begin driving transistor Q2 which is part of the base drive circuit for Q1. Also, transistor Q11 is turned off, so the soft start capacitor C16 will begin charging. As the capacitor C16 charges, the duty cycle increases to produce the soft start.

If the line voltage is quite high, the use of the one soft start capacitor does not provide an effective soft start action. To resolve this difficulty, the voltage VRAW1, which is always proportional to the line voltage, is fed through a zener diode CR21 to the base of transistor Q13. The zener voltage is selected so that Q13 is turned on when the line voltage exceeds 180 V. When Q13 is on, the capacitor C49 is connected into the timing circuit provided by resistor R23 and capacitor C16, adding capacitance to the circuit to assure a soft start with the higher voltage.

A current limiting circuit 72 is utilized for constantly monitoring the current flowing through the transformer T2. The current limiting circuit includes a transformer T3 which has its primary winding in series with the primary winding of transformer T2. The secondary winding of transformer T3 is connected in parallel with the circuit including a diode CR1 to rectify the current, and a resistor R6 is connected across the secondary winding of transformer T3 to determine the voltage output on the lines 74 and 75.

Resistors R32, R8 and R7 form a voltage divider, and the capacitor C8 filters out the switching noises. The output, then, on lines 76 and 78 is fed to the IC designated at U1 to pins 4 and 5. Pins 4 and 5 of IC U1 constitute an amplifier that amplifies the signal produced on lines 76 and 78.

It will be noted that resistor R7 is a potentiometer arranged to vary the voltage output on lines 76 and 78. This feature is to allow the arrangement to be adjusted to operate at a desired current level and to be adjusted for the particular chip used as U1.

The error signal provided to U1 on pins 4 and 5 cuts off the output of U1; and, the higher the voltage on lines 76 and 78, the earlier a cycle is cut off. The result is that, as the current in transformer T2 reaches higher levels, the current limiting circuit 72 reduces the length of the cycles. When the cycle becomes short enough, the +5 V produced by T2 will be reduced to the point that zener diode CR13 will turn off transistor Q8, triggering U2, which causes pin 5 to go high and turn off U1.

Looking further at the IC U1, it will be understood that the power supply of the present invention can be synchronized with the line as has been previously discussed, or the device can be free running, or the device can be synchronized with an external signal. In FIG. 3 of the drawings, it will be seen that an external signal can be provided on the line 79, through resistor R15, through jumper W1, and to the base of transistor Q4. Simply by removing the jumper W1, the frequency will be free running. Also, jumpers W4 connected to pin 6 of U1 allow the selection of one of three resistors, which allows one of three different switching frequencies.

With the foregoing in mind, the means for operating transistor Q1 should be understandable. Pin 11 of IC U1 is connected to the base of transistor Q2. Thus, an output from U1 will cause Q2 to turn on. When Q2 is on, the primary winding of transformer T4 will be connected between the voltage VRAW2 or V1 and ground. Since the secondary of T4 is connected to the base of Q1, Q1 will turn on to allow current flow through transformer T2, through Q1, to the bus 64 and to the line 34.

When the power supply is first started, it will be understood that the transformer T4 is powered by the start-up circuit, VRAW2 being connected through a diode CR16. After the transformer T2 is operating, the voltage V1 becomes the power source for transformer T4, V1 being connected through resistor R49 and diode CR2. This arrangement allows the power supply to begin operation even at very low line voltage; and once there is a significant output, that output is used to control the operation.

As Q1 turns off, the inductor current begins flowing through C7 and CR5 to charge C7. After the inductor current subsides, R4 and R16 discharge C7 so the snubbing circuit will be ready for the next turn-off cycle.

When transistor Q2 turns on, current flows into the primary of T4 at 85, and a positive voltage is generated on the secondary at 88. There is therefore a positive current flowing into the base of Q1 and back to the secondary of T4 at 89. The current turns on Q1 and charges capacitor C10 to a value determined by R61.

When Q2 turns off, point 88 becomes negative because of the reverse current flow in the primary winding of T4, through diode CR17 and resistor R11. The point 89 on the secondary will now be positive so that Q12 is turned on, connecting capacitor C10 to the emitter-base circuit of Q1. The emitter-base is thus reverse-biased, resulting in rapid removal of electrons from the base.

Realizing that an important part of the present invention is the fact that the condition of the circuit is monitored, attention is directed to the IC designated at U2. While this is indicated as a 556 IC, U2 is a dual 555 timer chip, and is arranged as two monostable oscillators. Resistor R33 and capacitor C33 control the delay timing, and resistor R31 and capacitor C32 control the delay timing for the relay K1. Also, from pin 5 of U2, there is a resistor R35 in the line 71 which is connected to pin 10 of IC U1. Resistor R35 in conjunction with resistor R52 forms an "OR" function for controlling pin 10 of U1 and the base of transistor Q11.

Looking briefly at the relay K1, it should be realized that, once the power supply is operational, pin 9 of IC U2 will be low so the transistor Q9 will be on, pulling the base of transistor Q5 down. Transistor Q5 will then turn on, allowing current to flow from VREF2, to the relay K1, through transistor Q5 and to ground. Since relay K1 will be energized, the normally closed contacts 49 and 59 will be opened, and transformer T1 will be de-energized.

From the foregoing discussion, it will be realized that the present invention provides a power supply that is usable over a wide range of voltages and frequencies. The start-up circuit produces a voltage that is directly proportional to the line voltage, and the arrangement is such that the main transformer T2 is not operational until there is a minimum voltage produced by the start-up circuit. Once the start-up circuit causes the main transformer T2 to begin operation, the output from the transformer is utilized in the control for the switching means so the power supply can continue operation even on very low line voltages. When the line voltage is very high, it will of course be quite easy to achieve the minimum voltage in the start-up circuit, but the higher energy must be controlled to prevent damage to the components. This energy is controlled by the current limiting circuit, and also by the snubber circuits to prevent damage to the switching transistor.

Once the power supply is operational, achieving the desired voltages, the start-up transformer is completely disconnected from the circuit to prevent electromagnetic interference; however, if the voltage again drops below a predetermined voltage, the power supply is shut down, and the relay K1 is de-energized causing the start-up circuit to be reconnected. The timer circuit built into the IC designated at U2 will require that the power supply be de-energized for a predetermined period of time, but the power supply will attempt to restart after this predetermined time. If the voltage remains low, the power supply will remain off without causing damage; or, if the voltage has increased to a usable level, the power supply will restart in accordance with the beginning procedure.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit of scope of the invention as outlined in the appended claims.

I claim:

1. A power supply for producing at least one stable DC voltage from an AC line voltage, said power supply including rectifying means connected to said line voltage for producing a DC voltage proportional to said line voltage, a first transformer, switching means for selectively connecting said first transformer across said DC voltage, said first transformer having a primary winding and at least one secondary winding, said secondary winding including rectifying means for preventing current flow in said secondary winding while said primary winding is connected to said DC voltage by said switching means, control means for controlling said switching means for varying the length of time said primary winding of said first transformer is connected across said DC voltage, and a start-up means for said power supply, said start-up means including a second transformer having a primary winding connected across said line voltage and a secondary winding for producing a voltage proportional to said line voltage, circuit means for providing said voltage proportional to said line voltage to said control means for controlling said switching means, and means for disconnecting said second transformer from said line voltage after said power supply is producing said stable DC voltage.

2. A power supply as claimed in claim 1, and further including a positive coefficient resistor in series with said primary winding of said second transformer for limiting the power supplied to said transformer.

3. A power supply as claimed in claim 2, said means for disconnecting said second transformer from said line voltage including normally closed relay contacts in series with said second transformer, and relay means for selectively opening said relay contacts, said relay means being operable from said power supply so that said relay means will open said normally closed contacts only when said power supply is producing a voltage.

4. A power supply as claimed in claim 1, said control means for controlling said switching means including a third transformer having a primary winding and a secondary winding, said secondary winding of said third transformer being connected to said switching means so that said switching means is on for the length of time said third transformer is energized, said primary winding of said third transformer being connected to an output of said power supply, pulse responsive means for allowing current to flow through said primary winding of said third transformer, and snubbing means for said switching means.

5. A power supply as claimed in claim 4, and including a fourth transformer having a primary winding and a secondary winding, said primary winding of said fourth transformer being connected in series with said primary winding of said first transformer, a current limiting circuit connected across said secondary winding of said fourth transformer, said current limiting circuit providing an adjustable signal proportional to the current in said primary winding of said first transformer for varying said pulse responsive means for allowing current to flow through said primary winding of said third transformer.

6. A power supply as claimed in claim 4, and further including a first voltage supply to said primary winding of said third transformer, said first voltage supply being from said start-up means, and a second voltage supply to said primary winding of said third transformer, said second voltage supply being from said secondary winding of said first transformer.

7. A power supply as claimed in claim 6, and further including a positive coefficient resistor in series with said primary winding of said second transformer for limiting the power supplied to said transformer.

8. A power supply as claimed in claim 7, said means for disconnecting said second transformer from said line voltage including normally closed relay contacts in series with said second transformer, and relay means for selectively opening said relay contacts, said relay means being operable from said power supply so that said relay means will open said normally closed contacts only when said power supply is producing a voltage.

* * * * *